US011114857B2

(12) United States Patent
Hinderliter et al.

(10) Patent No.: US 11,114,857 B2
(45) Date of Patent: Sep. 7, 2021

(54) MICROGRID ELECTRICAL LOAD MANAGEMENT

(71) Applicant: U.S. Well Services, Inc., Houston, TX (US)

(72) Inventors: Brandon N. Hinderliter, Houston, TX (US); Jared Oehring, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/268,030

(22) Filed: Feb. 5, 2019

(65) Prior Publication Data

US 2019/0245348 A1 Aug. 8, 2019

Related U.S. Application Data

(60) Provisional application No. 62/626,614, filed on Feb. 5, 2018.

(51) Int. Cl.
*H02J 3/14* (2006.01)
*E21B 43/26* (2006.01)
*H02J 3/38* (2006.01)

(52) U.S. Cl.
CPC .............. *H02J 3/14* (2013.01); *E21B 43/26* (2013.01); *E21B 43/2607* (2020.05); *H02J 3/381* (2013.01)

(58) Field of Classification Search
CPC ... E21B 41/0085; E21B 43/26; E21B 43/2607
See application file for complete search history.

(56) References Cited

U.S. PATENT DOCUMENTS

| | | |
|---|---|---|
| 1,656,861 A | 1/1928 | Leonard |
| 1,671,436 A | 5/1928 | Melott |
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |

(Continued)

FOREIGN PATENT DOCUMENTS

| | | |
|---|---|---|
| AU | 2007340913 | 7/2008 |
| CA | 2406801 | 11/2001 |

(Continued)

OTHER PUBLICATIONS

Non-Final Office Action dated Feb. 12, 2019 in related U.S. Appl. No. 16/170,695.

(Continued)

*Primary Examiner* — Jennifer H Gay
(74) *Attorney, Agent, or Firm* — Hogan Lovells US LLP

(57) ABSTRACT

A system for completing a well, including a generator, and a plurality of electric load components, each electric load component powered by the generator. The system further includes a load shedding control panel that monitors the generator and, if the generator loses functionality, is capable of deactivating one or more of the plurality of electric load components to reduce the electric load.

8 Claims, 4 Drawing Sheets

(56) References Cited

U.S. PATENT DOCUMENTS

| | | |
|---|---|---|
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,573,303 A | 3/1971 | Kerfoot |
| 3,722,595 A | 3/1973 | Kiel |
| 3,764,233 A | 10/1973 | Strickland |
| 3,773,140 A | 11/1973 | Mahajan |
| 3,789,601 A | 2/1974 | Bergey |
| 3,837,179 A | 9/1974 | Barth |
| 3,849,662 A | 11/1974 | Blaskowski |
| 3,878,884 A | 4/1975 | Raleigh |
| 3,881,551 A | 5/1975 | Terry |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley |
| 5,230,366 A | 7/1993 | Marandi |
| 5,366,324 A | 11/1994 | Arlt |
| 5,422,550 A | 6/1995 | McClanahan |
| 5,433,243 A | 7/1995 | Griswold |
| 5,439,066 A | 8/1995 | Gipson |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 5,950,726 A | 9/1999 | Roberts |
| 6,097,310 A | 8/2000 | Harrell et al. |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,802,690 B2 | 10/2004 | Han |
| 6,808,303 B2 | 10/2004 | Fisher |
| 6,931,310 B2 | 8/2005 | Shimizu et al. |
| 6,936,947 B1 | 8/2005 | Leijon |
| 6,985,750 B1 | 1/2006 | Vicknair et al. |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,926,562 B2 | 4/2011 | Poitzsch |
| 7,894,757 B2 | 7/2011 | Keast |
| 7,977,824 B2 | 7/2011 | Haien et al. |
| 8,037,936 B2 | 10/2011 | Neuroth |
| 8,054,084 B2 | 11/2011 | Schulz et al. |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria |
| 8,506,267 B2 | 8/2013 | Gambier et al. |
| 8,534,235 B2 | 9/2013 | Chandler |
| 8,596,056 B2 | 12/2013 | Woodmansee |
| 8,616,005 B1 | 12/2013 | Cousino |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope |
| 8,763,387 B2 | 7/2014 | Schmidt |
| 8,774,972 B2 | 7/2014 | Rusnak |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols |
| 9,103,193 B2 | 8/2015 | Coll |
| 9,119,326 B2 | 8/2015 | McDonnell |
| 9,121,257 B2 | 9/2015 | Coli et al. |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 | 4/2016 | Thomeer |

(56) References Cited

U.S. PATENT DOCUMENTS

| | | |
|---|---|---|
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 * | 5/2017 | Oehring .............. E21B 41/0021 |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,840,901 B2 * | 12/2017 | Oehring ................... E21B 43/26 |
| 9,863,228 B2 | 1/2018 | Shampine et al. |
| 9,893,500 B2 * | 2/2018 | Oehring ................... E21B 41/00 |
| 9,909,398 B2 | 3/2018 | Pham |
| 9,915,128 B2 | 3/2018 | Hunter |
| 9,932,799 B2 | 4/2018 | Symehuk |
| 9,963,961 B2 | 5/2018 | Hardin |
| 9,970,278 B2 * | 5/2018 | Broussard ............... E21B 43/26 |
| 9,976,351 B2 | 5/2018 | Randall |
| 9,995,218 B2 * | 6/2018 | Oehring ................... F02C 7/143 |
| 10,008,880 B2 | 6/2018 | Vicknair |
| 10,020,711 B2 * | 7/2018 | Oehring ................... E21B 43/26 |
| 10,036,238 B2 * | 7/2018 | Oehring ................... E21B 43/26 |
| 10,107,086 B2 | 10/2018 | Oehring |
| 10,119,381 B2 * | 11/2018 | Oehring ................... F04B 23/00 |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 * | 3/2019 | Oehring .................... B28C 9/04 |
| 10,246,984 B2 | 4/2019 | Payne |
| 10,254,732 B2 * | 4/2019 | Oehring ............. G05B 19/0428 |
| 10,260,327 B2 | 4/2019 | Kajaria |
| 10,280,724 B2 * | 5/2019 | Hinderliter ............. E21B 43/26 |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,408,030 B2 | 9/2019 | Oehring et al. |
| 10,408,031 B2 | 9/2019 | Oehring et al. |
| 10,415,332 B2 | 9/2019 | Morris |
| 10,436,026 B2 | 10/2019 | Ounadjela |
| 10,559,957 B2 * | 2/2020 | Pedersen .................... H02J 3/30 |
| 10,627,003 B2 | 4/2020 | Dale et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 10,738,535 B2 * | 8/2020 | Wern ...................... E21B 19/16 |
| 10,740,730 B2 | 8/2020 | Altamirano et al. |
| 10,753,165 B1 * | 8/2020 | Fischer ............... E21B 43/2607 |
| 2001/0000996 A1 | 5/2001 | Grimland et al. |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |
| 2004/0040746 A1 | 3/2004 | Niedermayr et al. |
| 2004/0102109 A1 | 5/2004 | Crafty et al. |
| 2004/0167738 A1 | 8/2004 | Miller |
| 2005/0061548 A1 | 3/2005 | Hooper |
| 2005/0116541 A1 | 6/2005 | Seiver |
| 2005/0201197 A1 | 9/2005 | Duell et al. |
| 2005/0274508 A1 | 12/2005 | Folk |
| 2006/0052903 A1 | 3/2006 | Bassett |
| 2006/0065319 A1 | 3/2006 | Csitari |
| 2006/0109141 A1 | 5/2006 | Huang |
| 2006/0260331 A1 | 11/2006 | Andreychuk |
| 2007/0131410 A1 | 6/2007 | Hill |
| 2007/0187163 A1 | 8/2007 | Cone |
| 2007/0201305 A1 | 8/2007 | Heilman et al. |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantel et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038907 A1 * | 2/2010 | Hunt .................. E21B 41/0085 290/7 |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 * | 3/2012 | Hopwood ................. E21B 3/00 307/32 |
| 2012/0063936 A1 | 3/2012 | Baxter et al. |
| 2012/0085541 A1 | 4/2012 | Love et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli et al. |

(56) References Cited

U.S. PATENT DOCUMENTS

| | | |
|---|---|---|
| 2013/0009469 A1 | 1/2013 | Gillett |
| 2013/0025706 A1 | 1/2013 | DeGaray et al. |
| 2013/0175038 A1 | 7/2013 | Conrad |
| 2013/0175039 A1 | 7/2013 | Guidry |
| 2013/0180722 A1 | 7/2013 | Olarte Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard et al. |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett |
| 2017/0212535 A1 | 7/2017 | Shelman et al. |
| 2017/0218727 A1* | 8/2017 | Oehring .................. E21B 43/26 |
| 2017/0218843 A1 | 8/2017 | Oehring |
| 2017/0222409 A1 | 8/2017 | Oehring |
| 2017/0226838 A1 | 8/2017 | Ciezobka |
| 2017/0226839 A1 | 8/2017 | Broussard |
| 2017/0226842 A1 | 8/2017 | Omont |
| 2017/0234250 A1* | 8/2017 | Janik ....................... B63B 21/50 |
| | | 700/286 |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1* | 2/2018 | Stegemoeller ........ B01F 5/0065 |
| 2018/0038216 A1 | 2/2018 | Zhang |
| 2018/0045331 A1 | 2/2018 | Lopez |
| 2018/0090914 A1 | 3/2018 | Johnson et al. |
| 2018/0109110 A1* | 4/2018 | Gerdes ....................... H02J 3/46 |
| 2018/0156210 A1* | 6/2018 | Oehring ................. H02P 29/032 |
| 2018/0181830 A1 | 6/2018 | Luharuka et al. |
| 2018/0183219 A1* | 6/2018 | Oehring .................. E21B 41/00 |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |

(56) References Cited

U.S. PATENT DOCUMENTS

| | | | |
|---|---|---|---|
| 2018/0320483 A1 | 11/2018 | Zhang | |
| 2018/0343125 A1 | 11/2018 | Clish | |
| 2018/0363437 A1 | 12/2018 | Coli | |
| 2018/0366950 A1* | 12/2018 | Pedersen | F02D 19/06 |
| 2019/0003329 A1 | 1/2019 | Morris | |
| 2019/0010793 A1* | 1/2019 | Hinderliter | E21B 43/26 |
| 2019/0040727 A1 | 2/2019 | Oehring et al. | |
| 2019/0063309 A1 | 2/2019 | Davis | |
| 2019/0100989 A1 | 4/2019 | Stewart | |
| 2019/0112910 A1 | 4/2019 | Oehring | |
| 2019/0115758 A1* | 4/2019 | Orban | H02J 3/30 |
| 2019/0119096 A1 | 4/2019 | Haile | |
| 2019/0120024 A1* | 4/2019 | Oehring | E21B 41/0092 |
| 2019/0128080 A1 | 5/2019 | Ross | |
| 2019/0128104 A1 | 5/2019 | Graham et al. | |
| 2019/0145251 A1 | 5/2019 | Johnson | |
| 2019/0154020 A1 | 5/2019 | Glass | |
| 2019/0162061 A1 | 5/2019 | Stephenson | |
| 2019/0169971 A1* | 6/2019 | Oehring | E21B 43/26 |
| 2019/0178057 A1 | 6/2019 | Hunter | |
| 2019/0178235 A1 | 6/2019 | Coskrey | |
| 2019/0203567 A1 | 7/2019 | Ross | |
| 2019/0203572 A1 | 7/2019 | Morris | |
| 2019/0211661 A1* | 7/2019 | Reckels | E21B 43/26 |
| 2019/0226317 A1 | 7/2019 | Payne | |
| 2019/0245348 A1* | 8/2019 | Hinderliter | E21B 43/26 |
| 2019/0249527 A1 | 8/2019 | Kraynek | |
| 2019/0257462 A1 | 8/2019 | Rogers | |
| 2019/0292866 A1 | 9/2019 | Ross | |
| 2019/0292891 A1 | 9/2019 | Kajaria | |
| 2019/0316447 A1 | 10/2019 | Oehring | |
| 2019/0383123 A1* | 12/2019 | Hinderliter | F01D 15/10 |
| 2020/0040705 A1* | 2/2020 | Morris | H02B 5/00 |
| 2020/0047141 A1 | 2/2020 | Oehring et al. | |
| 2020/0088152 A1 | 3/2020 | Allion et al. | |
| 2020/0232454 A1 | 7/2020 | Chretien | |
| 2020/0263498 A1* | 8/2020 | Fischer | H02B 5/00 |
| 2020/0263527 A1* | 8/2020 | Fischer | E21B 21/08 |
| 2020/0408070 A1* | 12/2020 | Rouse | E21B 4/04 |

FOREIGN PATENT DOCUMENTS

| | | |
|---|---|---|
| CA | 2707269 | 12/2010 |
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 201687513 | 12/2010 |
| CN | 101977016 | 2/2011 |
| CN | 202023547 | 11/2011 |
| CN | 102602322 | 7/2012 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 | 9/2004 |
| WO | 2016/144939 | 9/2016 |
| WO | 2016/160458 | 10/2016 |
| WO | WO-2017097305 A1 * | 6/2017 | H02J 3/30 |
| WO | 2018044307 A1 | 3/2018 |
| WO | 2018213925 A1 | 11/2018 |

OTHER PUBLICATIONS

International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
UK Power Networks—Transformers to Supply Heat to Tate Modern— from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.

(56) References Cited

OTHER PUBLICATIONS

Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
Final Office Action dated Mar. 31, 2020 in related U.S. Appl. No. 15/356,436.
Non-Final Office Action dated Mar. 3, 2020 in related U.S. Appl. No. 16/152,695.
International Search Report and Written Opinion dated Jul. 9, 2019 in corresponding PCT Application No. PCT/US2019/0275E34.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Office Action dated Sep. 3, 2019 in related U.S. Appl. No. 15/994,772.
Office Action dated Sep. 20, 2019 in related U.S. Appl. No. 16/443,273.
Canadian Office Action dated Oct. 1, 2019 in related Canadian Patent Application No. 2,936,997.
International Search Report and Written Opinion dated Jun. 2, 2020 in corresponding PCT Application No. PCT/US20/23809.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/loc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 19, 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.
Morris et al., U.S. Appl. No. 62/526,869; Hydration-Blender Transport and Electric Power Distribution for Fracturing Operation; Jun. 28, 2018; USPTO; see entire document.

(56) References Cited

OTHER PUBLICATIONS

Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/66543 dated May 11, 2021.

\* cited by examiner

MICROGRID ELECTRICAL LOAD MANAGEMENT

CROSS REFERENCE TO RELATED APPLICATIONS

This application claims priority to and the benefit of U.S. Provisional Application Ser. No. 62/626,614 filed Feb. 5, 2018 titled "MICROGRID ELECTRICAL LOAD MANAGEMENT," the full disclosure of which is hereby incorporated herein by reference in its entirety for all purposes.

BACKGROUND

1. Technical Field

This disclosure relates generally to hydraulic fracturing and more particularly to systems and methods for configuring high horsepower pumping systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Because of the problems associated with diesel and bi-fuel systems, some operators have turned to electric motors connected to turbine generators to power the pumps and other equipment associated with hydraulic fracturing operations. Electric hydraulic fracturing operations may utilize multiple turbine generators, ultimately powering multiple pumps.

One problem with electric powered hydraulic fracturing fleets is that if a single turbine generator fails, it will typically shutdown completely within a few seconds. If the power demand from the fracturing equipment is higher than the output of the remaining turbine generators, the remaining generators will begin to shut down within a few seconds as well. The reaction times by human operators are almost always too slow to manually shutdown pumps, thereby shedding electrical load, in time to prevent a blackout.

In a worst case scenario, this can lead to the pumps stopping instantly while pumping proppant laden fluid (often called "slurry" or "dirty fluid") so that a flush cannot be completed. Once fluid stops moving, the proppant begins to fall out of suspension and can accumulate in the wellbore. Horizontal wells have a vertical section before curving to the horizontal segment along the targeted shale formation. If proppant drops out of the slurry, it will slowly fall down the vertical segment and pile up at the curve (or heel) of the well and plug it off. Even if a partial flush is completed and proppant laden fluid is only in the horizontal segment of the well, proppant dropout can till cause plugging issues or can partially plug off the perforations in the well casing. This can also cause extended down time, or non-productive time, where several cycles of flowing the well back and performing low rate injection tests can be required to clear the well of proppant and open the perforations back up.

SUMMARY

One aspect of the present technology provides a system for completing a well. The system includes a generator and a plurality of electric load components, each electric load component powered by the generator, the system also includes a load shedding control panel that monitors the generator and, if the generator loses functionality, is capable of deactivating one or more of the plurality of electric load components to reduce the electric load.

In some embodiments, the technology can include a switchgear positioned between the generator and the plurality of electric load components to distribute power between the generator and the plurality of electric load components. In addition, the generator can be a natural gas turbine generator, a natural gas generator, a diesel generator, or a combination of these or other power sources.

According to some embodiments, the electric load components can be selected from the group consisting of electric hydraulic fracturing pumps (e.g., triplex frac pumps, quitiplex frac pumps, dual fracturing pump inots, long stroke intensifier pumps, or any other style of frac pump used to move hydraulic fracturing fluid), a blender, sand equipment, a hydration unit, and a data van. Furthermore, the load shedding panel can prioritize the order in which the plurality of electric load components will be deactivated, and can be programmed to deactivate the blender after other electric load components are deactivated. In yet further embodiments, the generator can be in selective electrical communication with a power grid.

Another aspect of the present technology provides a system for completing a well, including a generator, a plurality of hydraulic fracturing equipment components, each of the plurality of hydraulic fracturing equipment components powered by the generator, and an electric drilling rig, the electric drilling rig powered by the generator. The system can further include a load shedding control panel that monitors the generator and, if the generator loses functionality, is capable of deactivating one or more of the plurality of hydraulic fracturing equipment components or the electric drilling rig or other oilfield equipment to reduce the electric load.

In some embodiments, the technology can include a switchgear positioned between the generator and the plurality of hydraulic fracturing equipment components, and between the generator and the electric drilling rig, to distribute power between the generator and the plurality of hydraulic fracturing equipment components, and between the generator and the electric drilling rig. In addition, the generator can be a natural gas turbine generator, a natural gas generator, a diesel generator, or a combination of these or other power sources.

According to some embodiments, the hydraulic fracturing equipment components can be selected from the group consisting of electric hydraulic fracturing pumps (e.g., triplex frac pumps, quitiplex frac pumps, dual fracturing pumps, long stroke intensifier pumps, or any other style of frac pump used to move hydraulic fracturing fluid), a blender, sand equipment, a hydration unit, and a data van. Furthermore, the load shedding panel can prioritizes the order in which the plurality of hydraulic fracturing equipment components and the electric drilling rig or other oilfield equipment will be deactivated, and can be programmed to deactivate the blender after other hydraulic fracturing equipment components are deactivated. In yet further embodiments, the generator can be in selective electrical communication with a power grid.

Yet another aspect of the technology provides a method of completing a well. The method includes the steps of powering a plurality of hydraulic fracturing equipment components with a generator, monitoring the generator to determine when the generator loses functionality, and when the generator loses functionality, selectively deactivating one or more of the plurality of hydraulic fracturing equipment components to decrease the load.

According to some embodiments, the method can further include powering an electric drilling rig or other oilfield equipment with a generator. Furthermore, the plurality of hydraulic fracturing equipment can include at least one blender, and the method can further include the step of prioritizing the deactivation of the plurality of hydraulic fracturing equipment components so that the at least one blender is deactivated only after other hydraulic fracturing equipment is deactivated.

In alternate embodiments, the method can include distributing power from the generator to a power grid, and distributing power between the generator and the plurality of hydraulic fracturing equipment components with a switchgear. Furthermore, in yet further embodiments, the method can include a load shedding control panel that monitors the generator to determine when the generator loses functionality.

BRIEF DESCRIPTION OF DRAWINGS

The present technology will be better understood on reading the following detailed description of non-limiting embodiments thereof, and on examining the accompanying drawings, in which.

Figure 1:
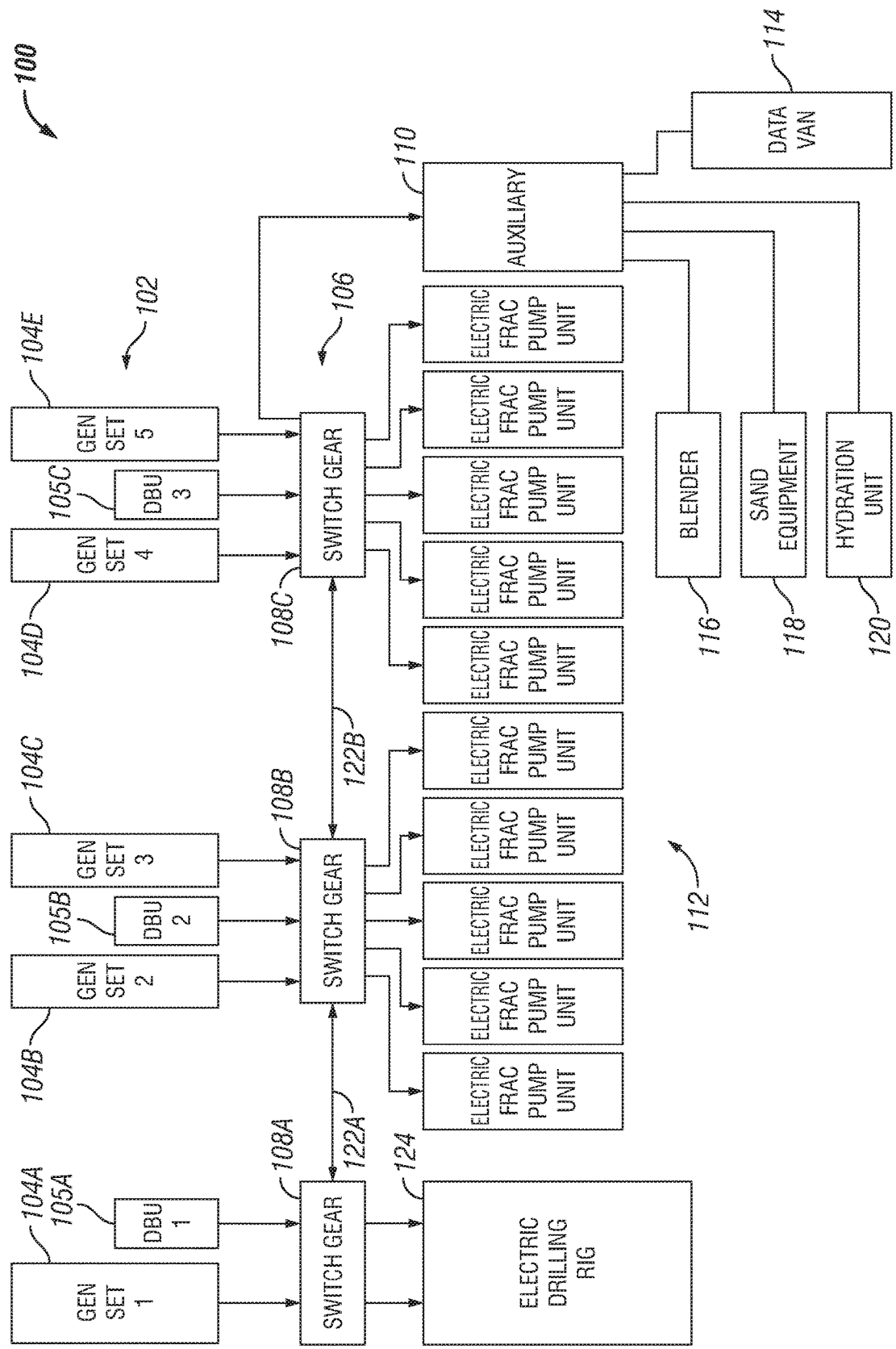
FIG. 1 is a schematic diagram of a load shedding control system according to an embodiment of the present technology.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for various pump configurations to produce greater horsepower (HP) output with a smaller footprint at a well site. In certain embodiments, various components may be arranged on a common support structure, such as a trailer or skid. For example, the trailer may include a transformer, variable frequency drive (VFD), soft start, and pump. In such embodiments, the total area available for pumps on the trailer may be decreased due to the support equipment, and as a result, the horsepower output from the pump may be reduced because of its size. In various embodiments, a separate skid or trailer may be utilized for certain support components to thereby enable larger pumps or more pumps to be positioned on the pump trailer to increase the total horsepower output and reduce the number of pump trailers arranged at the well site.

Embodiments of the present disclosure describe systems and methods for pumping configurations utilizing electric powered pumps that produce horsepower greater than or equal to diesel-powered pumping configuration. Diesel-powered systems are noisy and generate pollution. Moreover, transportation of fuel to well sites may be costly and availability of fuel may delay or otherwise bottleneck fracturing operations. In various embodiments, electric pumping configurations include trailers or skids with a pump and a VFD mounted on a single skid or trailer. In certain embodiments, the VFD or softstart may be moved to a separate auxiliary skid to increase the room available on the trailer or skid housing the pump. As a result, multiple pumps may be situated on the skid or trailer, or larger pumps may be situated on the skid or trailer. In various embodiments, a single trailer or skid may have a capacity for a 6000+HP output utilizing a variety of configurations such as a single pump with multiple electric motors, a single electric motor powering a large pump, a large electric motor powering multiple pumps, or the like.

In various embodiments, the pumps utilized with the disclosed configurations may include non-standard fluid ends (e.g., a fluid manifold with valves and seats to isolate a suction side and high pressure discharge side without allowing back flow). By way of example only, the fluid ends may include more than 3 plungers (e.g., triplex) or more than 5 plungers (e.g., quintaplex) or plunger stroke lengths longer than 11 inches. For example, the fluid ends may be septenplex (7 plungers), novenplex (9 plungers), undenplex (11 plungers), tredenplex (13 plungers), or include any other reasonable number of plungers. Size constraints and the like have produced difficulty utilizing such pumps in other systems. However, by adjusting the position of various support equipment for the pumps, such as VFDs, transformers, and motor control centers (MCCs), the trailer or skid may have sufficient size to accommodate larger or non-standard pumps for use with hydraulic fracturing. The pump may be of an intensifier style that utilizes hydraulic power to generate hydraulic horsepower using a VFD, softstart, or other controller for the electric pumps of the hydraulic system.

In various embodiments, the pumping configurations described herein may include a support skid. This support skid may include auxiliary components for operating the pumps, such as the VFDs, transformers, MCCs, and the like to thereby free up space on the skid or trailer housing the pumps for various additional different configurations, such as more pumps or larger pumps. While referred to herein as "support skids" it should be appreciated that the components associated with the support skids may be mounted on a skid or trailer. That is, the term "support skid" should not be interpreted as limiting the base or support structure to only a skid and other support structures, such as pads, trailers, truck beds, and the like may also be utilized and fall within the scope of the embodiments disclosed herein. Moreover, references to "pump trailers" should be interpreted as including embodiments where the support structure for the pumps and/or associated pumping equipment includes a trailer, a skid, a pad, a truck bed, or any other reasonable support structure.

Various embodiments utilize VFDs in order to control and monitor operation of the electric fracturing pumps. The VFDs may include soft stalls for improved operation. The soft stall allows the VFD to "disengage" the motor for a short amount of time (such as milliseconds) instead of tripping the VFD off to protect the drive and motor. Due to fluctuations in the wellhead pressure and pump fluid rate, if the VFD is near its upper limitations on torque a small fluctuation of pressure can cause the VFD to "trip" or shut down to protect itself to prevent damage. The soft stalls allow the VFD to stall temporarily then reengage the motor instead of shutting down completely. These "soft stalls" are unnoticed by the operator and are so quick that total fluid rate is not affected. This feature allows operation of the VFDs and motors at higher horsepower without fear of suffering an unexpected shutdown. Rated hydraulic horsepower (HHP) may be increased from 1,600 HP to 1,700 HP or more. In various embodiments, the soft stall is a software setting implemented as an executable instruction stored on a non-transitory machine readable memory and initiated by an associated processor of a control system.

According to systems of the present technology, electric motors may also be used to power other equipment associated with hydraulic fracturing operations. For example, the motors can power auxiliary equipment, such as blenders, proppant equipment, hydration units, etc.

The present technology relates to the process of automating the shedding and addition of electrical load and power generation from a mobile electric microgrid to prevent blackouts. In some embodiments, a software control package can be implemented to allow equipment that draws power to be automatically shut down when power demand is too high for the power generation equipment to supply, or if a generator failure causes an unexpected loss in available power supply. To prevent a black out (such as when all generators shut down due to too high of a power demand), certain equipment can be quickly shut down. This process is advantageous because it can prevent costly and potentially dangerous black outs, and can allow operators to prioritize equipment to be shed from the grid during these situations. The software controls can rapidly drop non-process critical equipment to allow power to be supplied to critical equipment until the last possible moment. The equipment can then be re-enabled for use by the operators once extra power generation is available. The control system can also automate the start-up and addition of any standby power generators to a microgrid.

For example, in one example hypothetical situation, there can be 4 turbine generators on a single power grid capable of supplying 23 MW of power to 16 frac pumps and 1 blender, as well as smaller auxiliary equipment. During operation, one turbine generator can suffer an unexpected mechanical failure and shut down during a frac stage where the power draw is 18 MW. This can happen very quickly. The power output capability of only 3 turbine generators in such a situation may be as low as 17 MW. As a result, within moments, the remaining turbine generators would be overdrawn and shutdown to protect themselves from failure. This shutdown in turn could cause the frac pumps to lose power, and they in turn would cease pumping fluid into the well. Lack of fluid circulation in the well could lead to a screenout, which occurs when fluid velocity is lost and the proppant drops out of the fluid and plugs the wellbore, causing extended downtime at great expense to clean out the well to resume operations.

In another non-limiting example, there can be a single turbine generator on a single power grid capable of supplying 30 MW of power to 22 frac pumps and 2 blenders, as well as smaller auxiliary equipment. During operation, the power available to one turbine generator can be reduced to only 20 MW of power. This can happen very quickly. If the running equipment draws greater than 20 MW of power, the turbine could be overdrawn and shutdown to protect itself from failure. This shutdown in turn could cause the frac pumps to lose power, and they in turn would cease pumping fluid into the well. Lack of fluid circulation in the well could lead to a screen out, which occurs when fluid velocity is lost and the proppant drops out of the fluid and plugs the wellbore, causing extended downtime at great expense to clean out the well to resume operations.

With the control system of the present technology, on the other hand, the power grid of the above hypothetical situations can automatically shut down one or two frac pumps at the time of the unexpected mechanical failure. This could lower the power draw requirement from 18 MW to, for example, 16 MW, thereby preventing a blackout and allowing the wellbore to be flushed properly, which would in turn prevent a screenout event. The order of shedding equipment can be prioritized. For example, the order can be preselected to ensure that the blender is the last piece of equipment dropped off the grid.

One advantage of the present technology is that is can provide management of standby generators during peak power demand. For example, in certain embodiments, equipment can have switch gear units equipped with extra input breakers allowing use of both turbine generators, as well as back-up diesel generators to power the system. The load management control system can be capable of automatically starting the back-up diesel generators once the power load reaches a specified percentage of the maximum capability of the turbine generators. For example, once the power draw of the frac equipment reaches about 80% of the capability of the turbine generators (in some embodiments, this could be about 18.5 MW), the control system can trigger the auto ignition of the spare diesel generators, but not close the breaker connecting them to the grid. Once the power load reaches about 90% of the turbine generator's capability, the control system can rev up the diesel generators, phase match the power, and close the breakers connecting to the power grid. In one specific example, if two 2000 kW diesel generators are connected, total power generation can reach 27 MW, and can power the frac fleet at peak power demand instead of shedding load, or forcing the frac pump operators to back down on fluid rate. Operating in this manner can eliminate or reduce the need for backup generators to idle constantly, thereby saving time, fuel, and wear and tear on the backup generators.

In certain embodiments, the backup generators can be automated. For example, the system can be designed so that if one turbine generator fails and shuts down and the load shedding system automatically shuts down two frac pumps (as discussed in the above example), the system can start up the back-up diesel generators and connect them to the grid, then enable the previously shutdown frac pumps to begin operation again. This will allow the pump operator to then begin using those frac pumps when sufficient power is available. Doing this will allow the frac stage to be completed normally instead of being forced to flush the well and shut down without properly completing the stage.

The technology herein shown and described is beneficial because it allows an operator to complete a fracturing stage, which usually consists of 2-4 hours of non-stop fluid pumping at the designed fluid rate, until the designed amount of proppant is displaced down the wellbore and into the shale formation. If the stage cannot be completed, in this case due to loss of power generation, the second best scenario is to flush the wellbore, which means to stop proppant delivery and to pump "clean" fluid only (non-proppant laden fluid) into the wellbore until all proppant laden fluid is displaced into the shale formation. If this is done, pumping can be stopped without any adverse consequences such as a screen out event, but the frac stage is usually considered incomplete. Flushing the well can take up to 10 minutes depending on the depth of the well and the fluid rate being pumped.

If a single turbine generator fails, it will typically shutdown completely within a few seconds. If the power demand from the fracturing equipment is higher than the output of the remaining turbine generators, the remaining generators will begin to shut down within a few seconds as well. The reaction times by human operators are almost always too slow to manually shutdown pumps, thereby shedding electrical load, in time to prevent a blackout. Thus, the software driven embodiments of the present technology are advantageous because they can greatly increase reaction times.

In a worst case scenario, this can lead to the pumps stopping instantly while pumping proppant laden fluid (often called "slurry" or "dirty fluid") so that a flush cannot be completed. Once fluid stops moving, the proppant begins to fall out of suspension and can accumulate in the wellbore. Horizontal wells have a vertical section before curving to the horizontal segment along the targeted shale formation. If proppant drops out of the slurry, it will slowly fall down the vertical segment and pile up at the curve (or heel) of the well and plug it off. Even if a partial flush is completed and proppant laden fluid is only in the horizontal segment of the well, proppant dropout can still cause plugging issues or can partially plug off the perforations in the well casing. This can also cause extended down time, or non-productive time, where several cycles of flowing the well back and performing low rate injection tests can be required to clear the well of proppant and open the perforations back up. If a blackout occurs, such that all frac pumps lose power and stop functioning, a shutdown turbine can take 15-30 minute to get operational again, while multiple turbines can take hours to restart and phase match to allow breakers to close to a common bus, or switch gear unit.

Another advantage of the present technology is that it provides for prioritized equipment shutdown. For example, the load management control system shown and described herein can save many hours of down time by preventing an electrical blackout. If, however, the electrical load that the system sheds is the auxiliary unit (which can power, for example, the blender, hydration unit, sand equipment, etc.) then the fluid flow will stop as well. The blender draws on low pressure water (typically about 20-60 psi), mixes in chemicals and proppants, and discharges the slurry at a high enough pressure (typically about 100-140 psi) to prevent cavitation in the fracturing pumps. A single blender can also be capable of providing up to 130 bpm of fluid (BPM=barrels per minutes, a barrel is 42 gallons of fluid and is a standard unit of measurement in US oilfield operations). On the other hand, a single frac pump is capable of taking 100 psi fluid from the blender and discharge it at up to 15,000 psi, but it can typically only pump at a max rate of about 5 to 12 bpm. If, therefore, a fracturing stage design requires 100 bpm of fluid rate then up to 20 frac pumps are required, but only 1 blender. Due to this, it is advantageous to prioritize the order of load shedding to make sure that the blender is shut down last, or not at all, even if it results in a blackout.

The system of certain embodiments of the present technology can allow the operator to preselect equipment to shed in a power loss situation. Operators can designate the blender to be the last piece of equipment to lose power (or to not lose power at all), and can choose frac pumps to be shed first that have mechanical issues such as worn out seats and valves, are experiencing high cavitation, cooling issues, have fluid leaks, or are overdue for routine maintenance.

It is common to have supplemental diesel powered frac pumps in fluid communication with the electric pumps. In some embodiments, the load shedding control system of the present technology can also recognize diesel pumps, and avoid shutting them down in an attempt to shed electrical load. It is also common to have energized electric pumps which are operable but are not actively pumping. De-energizing these pumps does not lower the electrical power load, and thus the control system can ignore them and only shutdown prioritized pumps which are consuming electrical power.

The embodiment of FIG. 1 shows a simplified block diagram of an embodiment of a hydraulic fracturing system 100, including a tie breaker load sharing management arrangement. In the illustrated embodiment, a power generation section 102 includes five turbine generators 104A-E and three diesel backup generators 105A-C arranged to produce electrical energy at approximately 13.8 kV and generate more than approximately 20 MW of power depending on demand, size, and the like. That is, different types of generators may be arranged at the well site and produce different quantities of electrical energy. Furthermore, different sizes of generators may be utilized in order to accommodate size and space restrictions at the well site. It should be appreciated that other equipment, such as compressors, filters, heaters, electronic equipment rooms and the like can be part of the system, but have been omitted from the figures for clarity.

The illustrated embodiment further includes a power distribution section 106 including switch gear units 108A-C for protection and distribution, as well as auxiliary unit 110. As shown, the generators 104A-E produce electrical energy at 13.8 kV for transmission to the switch gear units 108A-C. Thereafter, step down transformers (not shown) can receive and convert the energy to 600 V, which is distributed to pumps 112. As shown, the auxiliary unit 110 can be utilized to step down the energy for the associated fracturing equipment, such as a data van 114, blender 116, sand equipment 118, and a hydration unit 120. In various embodiments, the auxiliary unit(s) 110 may include transformers to step down the energy to 600 V, 240 V, or any other reasonable voltage output.

Continuing with FIG. 1, the illustrated embodiment includes hydraulic fracturing equipment, such as the illustrated pumps 112, data van 114, blenders 116, sand equipment 118, and hydration unit 120. It should be appreciated that various components have been simplified and/or removed for clarity. Moreover, the embodiment illustrated in FIG. 1 is not intended to be limiting. For instance, more than 10 frac pump units may be arranged at a well site. Moreover, multiple data vans, blenders, sand equipment, and hydration units may be utilized. The illustrated pumps 112 can be twin frac pumps. The twin frac pumps may be arranged on a common skid or trailer and receive energy from the transformers. It should be appreciated that the pumps 112 may be configured to operate at different voltages, such as 600 V, 13.8 kV, 4,160 V, or any reasonable voltage. Moreover, in embodiments the pumps 112 may be singular pumps mounted on a trailer or skid. However, in embodiments that utilize the twin frac pumps, the trailer or skid may include two fully independent, electrically powered fluid pumps. In various embodiments, the illustrated fleet is capable of generating approximately 16,000 HP for fracturing jobs. Different configurations, for example of the pumps, may enable more than approximately 20,000 HP.

The tie breaker load sharing management arrangement shown in FIG. 1 is similar in idea to the prioritized equipment shutdown discussed above. With a load shedding control system, it is less risky to provide power to equipment performing other operations. For example, on some larger well sites, it is possible to perform hydraulic fracturing operations on completed wells while a drilling rig is still operating on other wells. Drilling operations can be more sensitive than fracturing operations, and can be less tolerant of unplanned power losses.

In FIG. 1, the power generation components include generators 104A-E and diesel backup generators 105A-C. Power distribution components include the switch gears 108A-C and an auxiliary unit 110. The remaining components act as the power load. The arrows depict the electrical cable arrangement and the normal direction of electrical power flow. The equipment shown has tie breakers 122A, 122B for load sharing, as well as load shedding software in one embodiment (discussed in greater detail below). Switch gear tie breakers 122A, 122B allow the switch gear to act as a single bus (or circuit) and allow for phase matching and breaker protection. One aspect of the present technology is that the diesel backup generators 105A-C can be directly connected to the switch gears 108A-C to be used for load sharing, and they can be automated in the event of load shedding.

In the embodiment shown in FIG. 1, the microgrid provides power for a hydraulic fracturing fleet 100 and a drilling rig 124. In some embodiments, the drilling rig 124 can require up to about 4 MW of power, while a frac fleet for certain formations can require around about 22 MW of electrical power. For normal fracturing operations, the turbine generator 104A and switch gear 108A may not be needed.

Each switch gear 108A-C can be electrically connected with a tie breaker 122A, 122B. This is where smart automated management of power distribution comes into play. If one of the turbine generators 104B-E fail, the rig turbine generator 104A can supplement power to the frac equipment, but will prioritize the drilling rig 124, and will open the breaker 122A to the frac equipment if the power demand becomes too much and threatens shutting down the turbine 104A and causing a black out. This will force the frac equipment to begin load shedding to lower power demand.

The opposite is also true. That is, if the rig turbine 104A fails, the frac turbines 104B-E can provide power through the tie breaker 122A to ensure that drilling operations are uninterrupted. If there is not enough power available for simultaneous operations, the frac side can be forced to start load shedding to prevent a black out. The example herein is true if the diesel backup generators 105A-C are unable to provide enough supplementary power, or if they have failed as well (e.g., won't start due to cold weather, are out of fuel, take too long to start up and warm up, etc.). If the load shedding is not quick enough, or if there are multiple failed generators, the tie breaker 122A between the drilling rig and the frac equipment can be opened. This creates two independent circuits where failures occurring on one will not affect the other.

Figure 2:
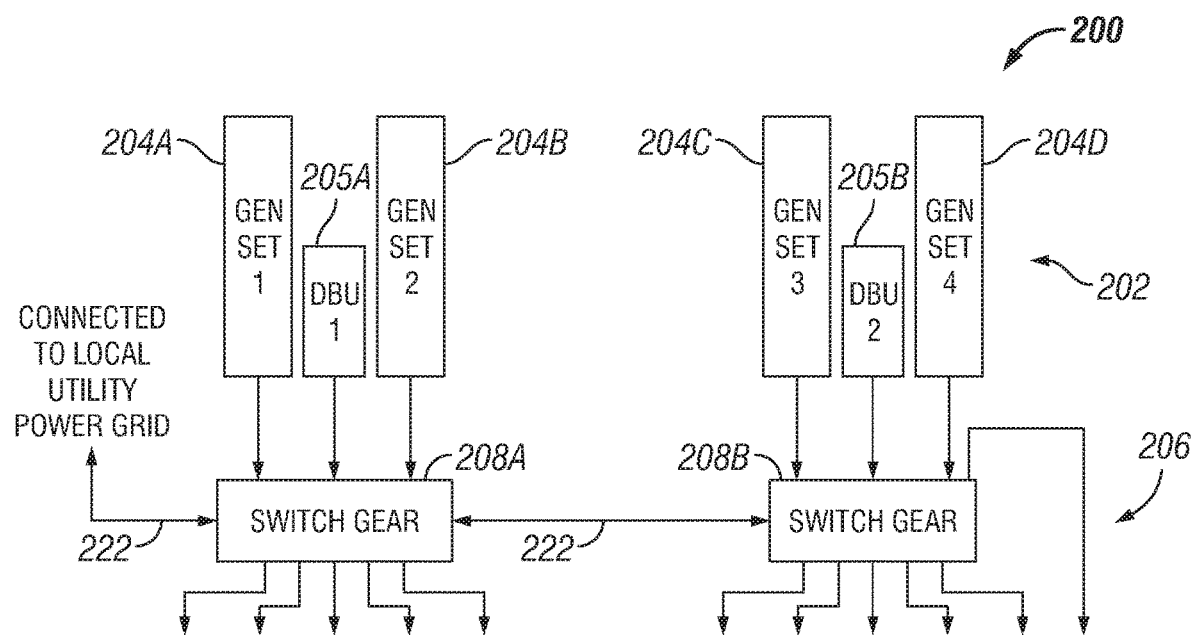
FIG. 2 is schematic diagram of a load shedding control system according to an alternate embodiment of the present technology.

Referring now to FIG. 2, there is shown an alternative embodiment of a hydraulic fracturing system 200, including a tie breaker load sharing management arrangement. In the illustrated embodiment, a power generation section 202 includes four turbine generators 204A-D and two diesel backup generators 205A, 205B arranged to produce electrical energy at approximately 13.8 kV and generate more than approximately 20 MW of power depending on demand, size, and the like. That is, different types of generators may be arranged at the well site and produce different quantities of electrical energy. Furthermore, different sizes of generators may be utilized in order to accommodate size and space restrictions at the well site. It should be appreciated that other equipment, such as compressors, filters, heaters, electronic equipment rooms and the like can be part of the system, but have been omitted from the figures for clarity.

The illustrated embodiment further includes a power distribution section 206 including switch gears 208A, 208B for protection and distribution. As shown, the generators 204A-D produce electrical energy at 13.8 kV for transmission to the switch gears 208A, 208B. Thereafter, step down transformers can receive and convert the energy to 600 V, which is distributed to pumps 112. An auxiliary unit can be utilized to step down the energy for associated fracturing equipment, such as, for example a data van, blender, sand equipment, and a hydration unit. In various embodiments, the auxiliary unit may include transformers to step down the energy to 700 V, 600 V, 240 V, or any other reasonable voltage output.

One advantage of the present technology is that, with this level of power distribution management, it is possible to safely and reliably connect the mobile microgrid to a local utility grid. Typically, connecting to a utility power grid is risky due to the power demands of a frac fleet being too large and too unstable for a utility grid to handle without itself becoming unstable. Now, with an automatically managed utility tie breaker 222 and load shedding control software, it is possible to connect to the power grid to supply excess power to the utility when available. The opposite is true as well. That is, it is possible to draw power from the utility grid to supplement the oilfield equipment when the utility grid is far from its peak demand. This is without the risk of a black out if the utility needs to disconnect or experiences a service interruption. If this happens, and the generators 204A-D can't make up the difference in power supply, the control software can simply load shed equipment to keep fluid moving.

One mode of practicing the processes herein shown and described is to have a central datavan 114 (shown in FIG. 1), or data unit for the fracturing equipment control load shedding software. The datavan 114 can already have a resident software control package that controls, monitors, and records all activity of the fracturing equipment, and is already able to remotely shut down frac pumps. It can also be able to monitor turbine power load and can remotely open switch gear breakers with operator input.

In some embodiments, the system can have the ability to automatically start up and connect the diesel backup generators 205A, 205B based on power demand, to instantly shut down equipment based off of prioritization, and to automatically open or close switch gear breakers. The preference to shed load can be to simply stop the electric motor(s) without opening the switch gear breakers. This may allow quick re-energization of the equipment once power is restored or a backup source of power is connected (e.g., the diesel backup generators, a non-frac generator on an adjacent switch gear, or a utility grid). This can also reduce wear and tear on the large breakers with physically moving parts, and reduces the risk of an arc flash inside the switch gear 108A, 108B. The tie breakers 222 for load sharing can be controlled by operating the physical breakers to make the electrical connections.

Figure 3:
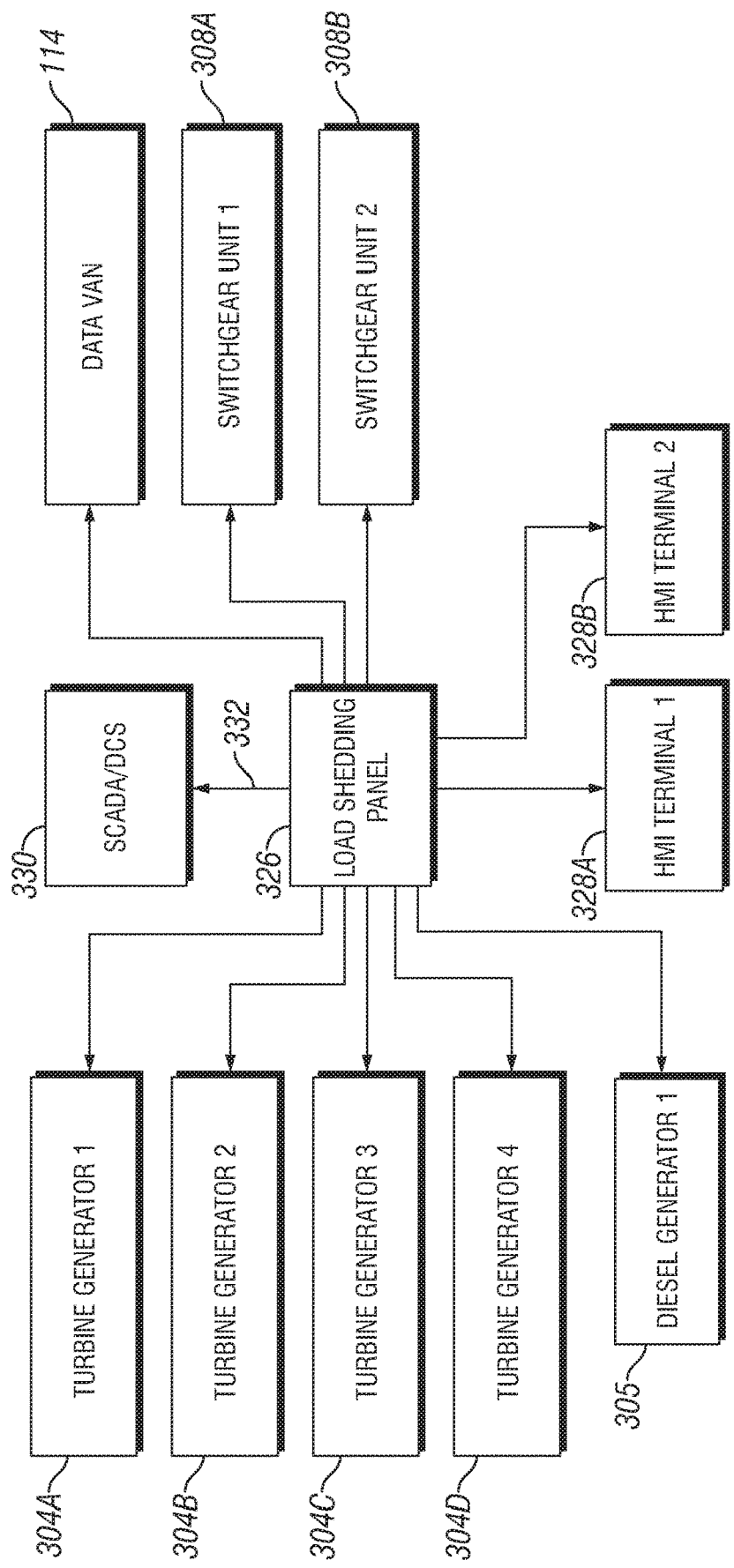
FIG. 3 is a schematic diagram of a load shedding control system according to yet another embodiment of the present technology, where the load shedding control package communicates with turbine generators.

Referring now to FIG. 3, alternate embodiments of the present technology include control software and hardware that can be installed in switch gear trailers. Such software and hardware can include a load shedding panel 326 in communication with switchgear units 308A, 308B and turbine generators 304A-D, as well as backup diesel generator 305. The load shedding panel 326 can also be in communication with programming terminals 328A, 328B, such as a computer, and a distributed control (DCS) system or supervisory control and data acquisition (SCADA) system 330. In some embodiments, communication between the programming terminal 328 and the load shedding panel 326, and between the DCS/SCADA system 330 and the load shedding panel 326 can be via Ethernet or other cable 332. In other embodiments, such communication can be wireless.

The software and hardware shown in FIG. 3 can have individual breaker power load information, and control over opening and closing breakers without the need for communication cables to a datavan. In addition, in some embodiments, it may also be possible to install the load shedding control package in the turbine generators 304A-D. Advantageously, the system of FIG. 3 can be set up for controlling and monitoring power generation only, without the consideration of the frac fleet or other types of oilfield equipment.

At least two alternate methods can be used for shutting down electrical equipment to shed power loads. These include 1) opening the associated breaker for that particular piece of equipment, or 2) by signaling the onboard control system to stop the large electric motor and any associated electrical loads. Opening the breaker will shed all electrical load by cutting off power to the entire piece of equipment. On the other hand, signaling the onboard control system to shut down the VFD and drive motor will cut most of the power load while keeping the control system energized so it can be quickly restarted and process monitoring instruments can still be recording and reporting information, such a pressures and temperatures.

While a single blender is shown and described in individual figures in this disclosure, the present technology contemplates perform load shedding with multiple auxiliary units and blenders. Some operators require two blenders to be onsite and powered at all times. In such a case, one blender can be prioritized for load shedding over the other. There are also designs to manufacture a blender that does not require an auxiliary unit.

The load shedding control system of the present technology also works independently of the placement of the VFDs or transformers. They can be individual skids/trailers or they can be included onboard the pump trailers or blenders. In addition, in certain embodiments, the system of the present technology can work on electrically powered equipment that is skid mounted, trailer mounted, or bodyload mounted.

The load management control system can work for any commonly used voltage due to its ability to control the electrical breakers and/or the onboard controls for the equipment. This includes the power distribution methods of constant voltage where the voltage generated is also the voltage utilized by the equipment, a step up voltage transformer where the voltage that is generated is stepped up to a higher voltage for use by the equipment, and the use of step down voltage transformers where the voltage generated is stepped down to be utilized by the equipment.

There are also some designs that require a 1:1 voltage transformer where the voltage is not changed, but is used to isolate the equipment from what is sometimes called "dirty power," where harmonics or ripples can affect the quality of the power supply, and an isolation transformer can be used to prevent damage to the equipment. Common voltages used are 13.8 kV, 4,160V, 700 V, 600V, and 480V.

In some embodiments, different oilfield equipment may require different voltages. Possibly, the fracturing equipment can require 600V, but a drilling rig can require 480V. It is even possible that different types of electrically powered frac equipment can be used where some frac pumps require 600V and others require 4,160V. In such situations, the use of step down or step up transformers can be provided. These transformers can be installed onboard the pump trailers, or can be separate pieces of equipment with interconnecting electrical cables.

According to some embodiments of the present technology, the microgrid can safely and reliably provide power to a utility grid or third party power grid (e.g., for other oilfield or industrial processes), or to supplement from it to a certain amount of power. If the electrical draw from the microgrid becomes too large for the utility grid to handle, the tie breaker can be opened to isolate the grids to prevent a black out of the utility. The opposite is also true. If the utility is drawing too much power from the microgrid, it can be "shed." These parameters can be set in the software prior to energizing equipment and connecting external utility grids.

In other words, embodiments of the present technology provide for limited tie breaker load sharing or full tie breaker load sharing. Limited tie breaker load sharing can open the breaker when an allowable power draw is exceeded, such as for an external power grid or non-critical process. Full tie breaker load sharing can be used for common processes such as frac equipment that requires multiple switchgear to electrically connect everything. In this case, no limits can be imposed on the tie breaker (other than for safety so breakers or power cables don't fail) and the load management system can shed load or add generators as needed while keeping the tie breaker between switch gears closed to allow load sharing.

Often times smaller diesel generators only operate at 480V or 600V. If one of these is used as a DBU, a step up transformer may be required to allow it to be electrically connected to the microgrid. There may also be situations where step down transformers will be required to voltage match generators so they can be tied to a common bus. This is also true for when a utility grid is being electrically connected to the microgrid. Utilities often operate at different voltages and can be stepped up or stepped down, or possibly require the use of an isolation transformer.

This load shedding control system of the present technology can be used with or without switch gear tie breakers. The load management software can prevent blackouts even it if has to treat each switch gear as an isolated circuit.

According to some embodiments, each incoming generator connection to a switch gear can be a diesel or natural gas powered turbine engine or reciprocating engine. The power output capacity is inconsequential as well. Smaller diesel or natural gas generators can be as little as 400 kW or as large at 2000 kW. Larger generators (usually turbines) can be from 3,000 kW all the way up to 30,000 kW, and in some cases even larger.

Figure 4:
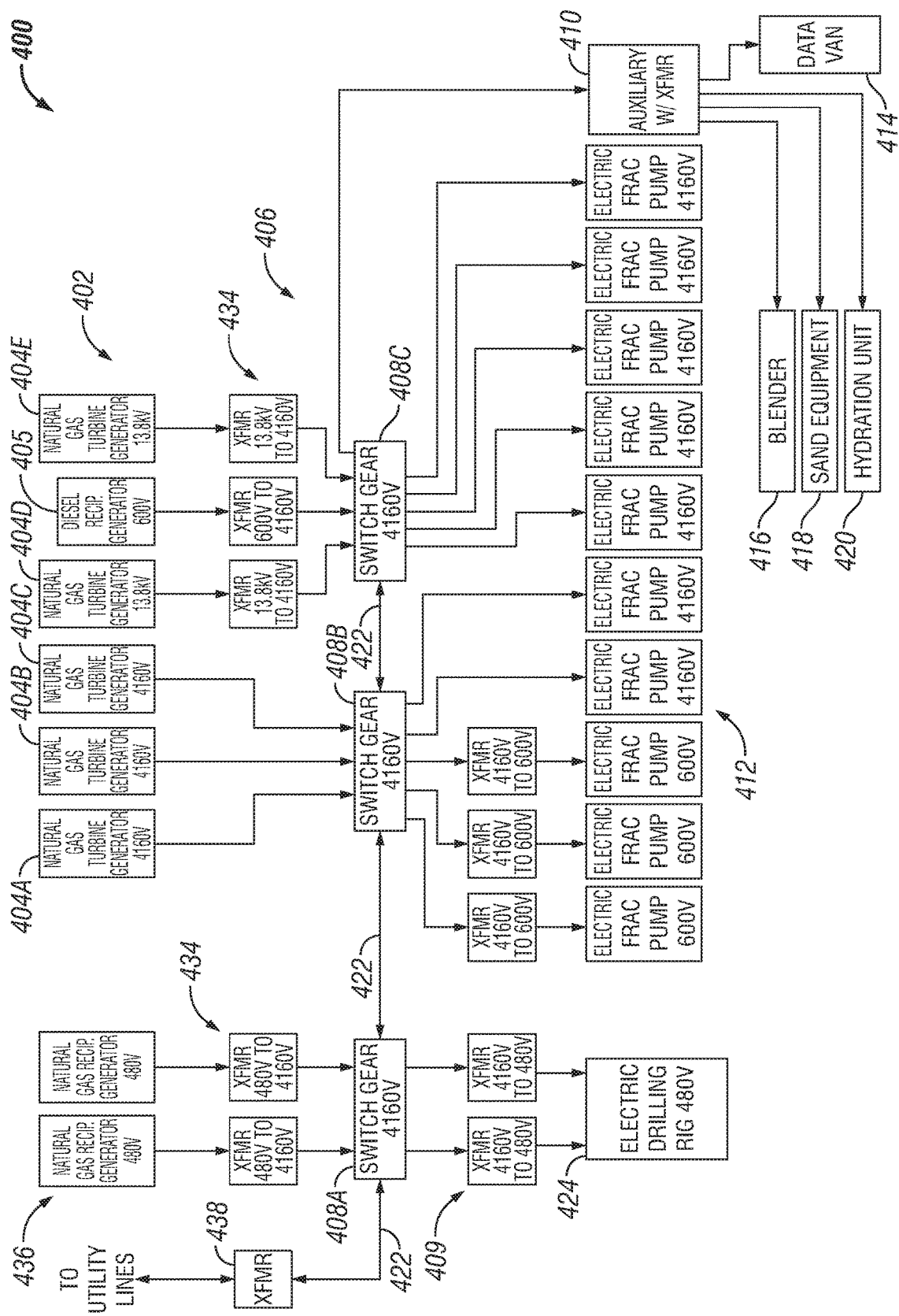
FIG. 4 is a schematic diagram of a load shedding control system according to another alternate embodiment of the present technology.

Referring now to FIG. 4, there is shown a system 400 incorporating most of the features described above in a single microgrid. Thus, FIG. 4 illustrates the capabilities of oilfield power generation with a mobile microgrid outfitted with a load management software control package. For example, FIG. 4 includes a power generation section 402 includes five turbine generators 404A-E and a diesel backup generator 405. Different types of generators may be arranged at the well site and produce different quantities of electrical energy. Furthermore, different sizes of generators may be utilized in order to accommodate size and space restrictions at the well site. It should be appreciated that other equipment, such as compressors, filters, heaters, electronic equipment rooms and the like can be part of the system, but have been omitted from the figures for clarity.

The illustrated embodiment further includes a power distribution section 406 including switch gear units 408A-C for protection and distribution, as well as auxiliary unit 410. As shown, the generators 404A-E produce electrical energy for transmission to the switch gear units 408A-C. Thereafter, step down transformers can receive and convert the energy to to a different voltage, as needed, and the energy is then distributed to pumps 412. As shown, the auxiliary unit 410 can be utilized to step down the energy for the associated fracturing equipment, such as a data van 414, blender 416, sand equipment 418, and a hydration unit 420. In various embodiments, the auxiliary unit(s) 410 may include transformers to step down the energy as required.

Continuing with FIG. 4, the illustrated embodiment includes hydraulic fracturing equipment, such as the illustrated pumps 412, data van 414, blenders 416, sand equipment 418, and hydration unit 420. It should be appreciated that various components have been simplified and/or removed for clarity. Moreover, the embodiment illustrated in FIG. 4 is not intended to be limiting. For instance, more than 10 frac pumps may be arranged at a well site. Moreover, multiple data vans, blenders, sand equipment, and hydration units may be utilized. The illustrated pumps 412 can be twin frac pumps. The twin frac pumps may be arranged on a common skid or trailer and receive energy from the transformers. It should be appreciated that the pumps 412 may be configured to operate at different voltages. Moreover, in embodiments the pumps 412 may be singular pumps mounted on a trailer or skid with or without an integrated transformer.

The system of FIG. 4 includes step up transformers for power generation, step down transformers 409 (discussed above) for power generation, a diesel backup generator 405 electrically connected to the bus (switch gear system), natural gas reciprocating generators 436 electrically connected to the bus, natural gas turbine generators 404A-D electrically connected to the bus, turbine generators having different voltage outputs, switch gear tie breakers 422, a tie breaker to a local utility grid with a transformer 438 if needed (transformer 438 can be step up, step down, or isolation, according to the requirements of the system). The system can also include the ability to supply power to a non-fracturing application at a different voltage (e.g., the drilling rig at 480V), step down transformers 409 for equipment, as well as step up and step down transformers 434 for voltage matching the power distribution switch gear.

The use of different types of generators allows for constant voltage (e.g., 4,160V power generation supplying 4,160V frac equipment), step down voltage (4,160V and 13.8 kV generators supplying power to the common bus which is being stepped down to power 600V frac equipment and 480V drilling equipment, and even the 13.8 kV being stepped down to 4,160V), and step up voltage (e.g., 480V generators on the same common bus providing power for the 600V and 4,160V frac equipment). This arrangement allows for frac equipment of different operating voltages pumping on a common well, or even on different wells.

In the embodiment shown in FIG. 4, the diesel generator can be used as prime power or as a diesel backup generator. Similarly, any electrically connected generator can be used for prime power or standby (back-up) power. Furthermore, any standby generator can be managed by the load shedding software of the present technology to automatically start and connect to the bus if total power load is approaching the maximum power generation of the prime power generators.

Power loads can be shed individually but shutting down specific frac pumps, or power load can be shed in groups by opening up tie breakers in extreme power loss situations.

The present disclosure described herein, therefore, is well adapted to carry out the objects and attain the ends and advantages mentioned, as well as others inherent therein. While presently preferred embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A system comprising:
    a generator;
    hydraulic fracturing equipment, including a blender, electrically connected to the generator;
    an electric drilling rig, the electric drilling rig electrically connected to the generator;
    a load shedding control panel that monitors the generator and, if the generator loses functionality, is capable of deactivating the hydraulic fracturing equipment before the electric drilling rig to reduce the electric load while ensuring continued power to the drilling rig, and wherein the load shedding panel is programmed to deactivate the blender after other hydraulic fracturing equipment is deactivated;
    a first switch gear positioned between the generator and the hydraulic fracturing equipment to distribute power between the generator and the hydraulic fracturing equipment, and a second switchgear positioned to distribute power between the generator and the electric drilling rig.

2. The system of claim 1, wherein the generator is a natural gas turbine generator, a natural gas generator, or a diesel generator.

3. The system of claim 1, wherein the hydraulic fracturing equipment is selected from the group consisting of electric hydraulic fracturing pumps, a blender, sand equipment, a hydration unit, and a data van.

4. The system of claim 3, wherein the load shedding panel prioritizes the order in which particular hydraulic fracturing equipment and the electric drilling rig will be deactivated.

5. The system of claim 1, wherein the generator is in selective electrical communication with a power grid.

6. A method of managing power between an electric drilling rig and hydraulic fracturing equipment, including a blender, the method comprising the steps of:
    a) powering the hydraulic fracturing equipment with a generator;
    b) distributing power between the electric drilling rig and the generator with at least one switchgear;
    c) distributing power between the generator and the hydraulic fracturing equipment with the at least one switchgear;
    d) monitoring the generator to determine when the generator loses functionality;
    e) when the generator loses functionality, selectively deactivating the hydraulic fracturing equipment before the electric drilling rig to decrease the load; and
    f) prioritizing the deactivation of the hydraulic fracturing equipment so that the blender is deactivated after other hydraulic fracturing equipment is deactivated.

7. The method of claim 6, further comprising:
    distributing power from the generator to a power grid.

8. The method of claim 6, wherein step c) is carried out by a load shedding control panel that monitors the generator to determine when the generator loses functionality.

* * * * *